United States Patent [19]
Kitchens

[11] Patent Number: 4,883,225
[45] Date of Patent: Nov. 28, 1989

[54] FAIL-SAFE THERMOSTAT FOR VEHICULAR COOLING SYSTEMS

[75] Inventor: James L. Kitchens, Haiku, Hi.
[73] Assignee: S.T.C., Inc., Haiku, Hi.
[21] Appl. No.: 170,405
[22] Filed: Mar. 18, 1988
[51] Int. Cl.⁴ .............................................. F01P 7/02
[52] U.S. Cl. .................................. 236/34.5; 137/73; 137/74; 236/DIG. 5; 236/93 A
[58] Field of Search ................... 236/34, 34.5, DIG. 5, 236/100, 93 A, 99 J; 137/73, 74

[56] References Cited
U.S. PATENT DOCUMENTS

| | | | |
|---|---|---|---|
| 1,952,516 | 3/1934 | Sperry et al. | 137/73 X |
| 3,045,918 | 7/1962 | Woods | 137/74 X |
| 3,498,537 | 3/1970 | Wong | 236/34 |
| 4,245,782 | 1/1981 | Brown | 236/34.5 |
| 4,469,275 | 9/1984 | DeSalve | 137/73 X |
| 4,537,346 | 8/1985 | Duprez | 236/34.5 |

*Primary Examiner*—William E. Tapolcai
*Attorney, Agent, or Firm*—Merchant & Gould

[57] ABSTRACT

A fail-safe thermostat for vehicular cooling systems is positioned in a junction leading to an internal coolant passageway, a radiator passageway and a bypass passageway. An open housing seated in the junction supports a fixed central rod extending into the wax filled interior of a movable cylindrical member which controls the position of the interior segment of a main valve. Expansion of the wax forces the cylindrical member in a first direction against a compression spring. Fusible alloy is disposed in the coupling between the cylindrical member and the main valve, and melts at a specific temperature range in excess of the normal range. When this occurs the coupling is released in such a way that the spring forces the valve member to a second limit position opposite to the direction of expansion. A bypass closure member at one end of the cylindrical member may be used to close the bypass passageway concurrently with increased temperature.

16 Claims, 4 Drawing Sheets

FAIL-SAFE THERMOSTAT FOR VEHICULAR COOLING SYSTEMS

BACKGROUND OF THE INVENTION

This invention relates to devices for automatically controlling the flow of coolant, in accordance with coolant temperature, in a vehicular cooling system, and more particularly to fail-safe thermostats for automotive cooling systems.

In automotive cooling systems, the thermostat is disposed in a junction of at least two passageways, one of which is a passageway to or from a water pump, while another is a passageway to or from a radiator or heat exchanger. A bypass may also be coupled into the junction, to provide a shunt flow around the radiator to allow more rapid warm-up of the engine when starting. A thermostat disposed in the junction, usually in a standardized mount, is accessed through a replaceable dome so that the thermostat may be inspected and replaced if necessary, as in the event of failure. The function of the thermostat is to provide flow control, in response to temperature, so as to utilize the heat exchanger properties of the radiator to maintain the coolant temperature substantially constant in operation. Where bypass operation is used, the bypass should be open only under start-up conditions and should preferably be shut off if the thermostat fails.

Most modern thermostats have brass or similar metal housings of generally circular outline, and incorporate a hollow cylinder disposed about a central axis that encloses one end of a movable central rod. The interior of the cylinder is filled with a thermally responsive wax material which has a substantial thermal coefficient of expansion. When heated, the wax exerts substantial force on the central rod, resulting in a relative displacement. In one type of design, as shown by C. W. Wood U.S. Pat. No. 2,806,375 and U.S. Pat. No. 2,806,376, the central rod is axially movable in and out relative to the housing in response to temperature, and a control device outside the housing may be employed in the principal coolant flow paths so as to provide proportional flow control in accordance with temperature. In another type of thermostat as shown by J. E. Woods U.S. Pat. No. 3,045,918, the variable valve action is provided by a fixed center rod, with movement of an actuator about the rod controlling opening of a valve disk against a tension spring. The mounting for the rod is in the form of an open spider which when open permits flow through the valve.

While earlier types of thermostats are usually reliable in operation, they can nonetheless fail, with what can be catastrophic consequences because of engine over-heating. Parts often stick due to corrosion or the temperature responsive material may leak. Recognizing these factors, various attempts have been made to provide protection against catastrophic operation. Examples are Woods U.S. Pat. No. 3,045,918 and Duprez U.S. Pat. No. 4,537,346. In the Woods patent the valve member is normally urged toward the closure position by a tension spring, but the spring is seated on the valve member in a fusible material which gives way at a certain temperature between the normal range and the level of drastic overheating. The valve member is then acted upon by coolant pressure, and the valve with the attached actuator is freed to open the flow path. This arrangement does not control the final position of the valve and is not configured for bypass operation.

The use of fusible alloys for thermal control of a coolant is also evidenced by the Duprez patent, which, however, is intended to control oil flow through a heat exchanger. In accordance with Duprez an actuator containing an internal actuator rod is disposed in a serpentine oil flow path to function as a spool valve, in dependence upon its position. At the upper end of the structure, an interior spring urges the valve axially downward toward a fully open position, but is restrained by a fusible material outside the cylinder. When the fusible material melts at a particular temperature, however, and flows down into the remainder of the system, the spring is freed to urge the actuator toward a more fully open position, thus preventing overheating. This configuration is specialized, and not amenable to use with automotive thermostats, and further introduces a substantial amount of the fusible material into the coolant flow path.

It is desirable in some configurations to control flow in the bypass path as well as provide proportional control of the valve position in the principal path between the engine passageway and the radiator passageway. In these configurations the bypass path is to be closed off when normal temperature is reached. In all configurations fusible material should not be introduced into the flow path in any substantial quantity. The device should provide substantial protection against sticking, corrosion and other factors that can lead to failure and should be insertable in standardized thermostat mounts.

SUMMARY OF THE INVENTION

A fail-safe thermostat in accordance with the invention incorporates a thermostat seatable in a junction region between an engine block passageway and a principal radiator passageway. The housing of the thermostat is open on opposite sides of a disk valve member having a fixed outer segment and a movable inner segment. A cylindrical actuator encompassing a fixed central rod surrounded by thermally responsive material is disposed within the periphery of the inner segment, and coupled thereto. A compression spring is positioned around the cylindrical member between the housing and the inner valve segment, opposing its movement in response to increasing temperature. In normal temperature operation the expansion of the thermally responsive material within the cylinder, as the circulating fluid heats, urges the cylindrical member and the inner valve segment in a direction to open the path between the engine block and the radiator passageway to a degree dependent on temperature. If the temperature becomes substantially higher than normal, however, fusible material positioned in the coupling between the housing, rod, and cylindrical member gives way at a predetermined temperature. This action allows the compression spring to drive the inner valve segment to a limit on the opposite side of the closed position from its normal operating position and into the radiator passageway, thus permitting full coolant flow.

The fail-safe thermostat may also control flow in a bypass passageway leading into the junction region. A bypass closure member is coupled to the cylindrical actuator at an extension that leads toward the bypass passageway. As the cylindrical member is increasingly displaced with temperature the bypass passageway is diminished, until it is finally closed when the closure member seats against wall surfaces. The closure member is spring loaded against the extension by a compression spring which yields to prevent overpressure when the cylindrical actuator position carries beyond the point at which the closure member is engaged.

In a specific example of a device in accordance with the invention, the cylindrical member is coupled to the inner segment via an external sleeve closely fitting about one end of the cylindrical member, and joined thereto by a thin layer of the fusible alloy material. The alloy layer between the sleeve and cylindrical member withstands shear forces until the predetermined temperature level is reached and the alloy becomes plastic and reduces the adhesion between the sleeve and the inner valve segment. The main spring then forces the valve member to a fail-safe open position at an opposite limit. Concurrently the cylindrical member remains extended toward the bypass path and the second spring between the housing and the bypass valve biases the closure member into firm contact with the wall.

In another example of a device in accordance with the invention, the cylindrical member is slidable in the housing and incorporates a shorter internal cylinder within which the central rod and thermally responsive material are held. An end chamber next to the inserted end of the internal cylinder is initially filled with solidified fusible alloy to cause the cylindrical member to move against the spring, opening the valve, as the thermally responsive material expands with increasing temperature. If an excessive temperature is reached, however, the fusible material gives way and the end of the internal cylinder acts as a piston, displacing the fusible material into the space about the internal cylinder, as the compression spring is now able to urge the inner valve member and attached cylindrical member in the opposite direction. At this time some of the wax is also displaced, permitting further travel of the spring and associated parts. The inner valve segment thereby moves to a position past the outer valve segment on the opposite side, opening the flow path to the radiator passageway in the fail-safe mode.

BRIEF DESCRIPTION OF THE DRAWINGS

A better understanding of the invention may be had by reference to the following description, taken in conjunction with the accompanying drawings, in which.

DETAILED DESCRIPTION OF THE INVENTION

Figure 1:
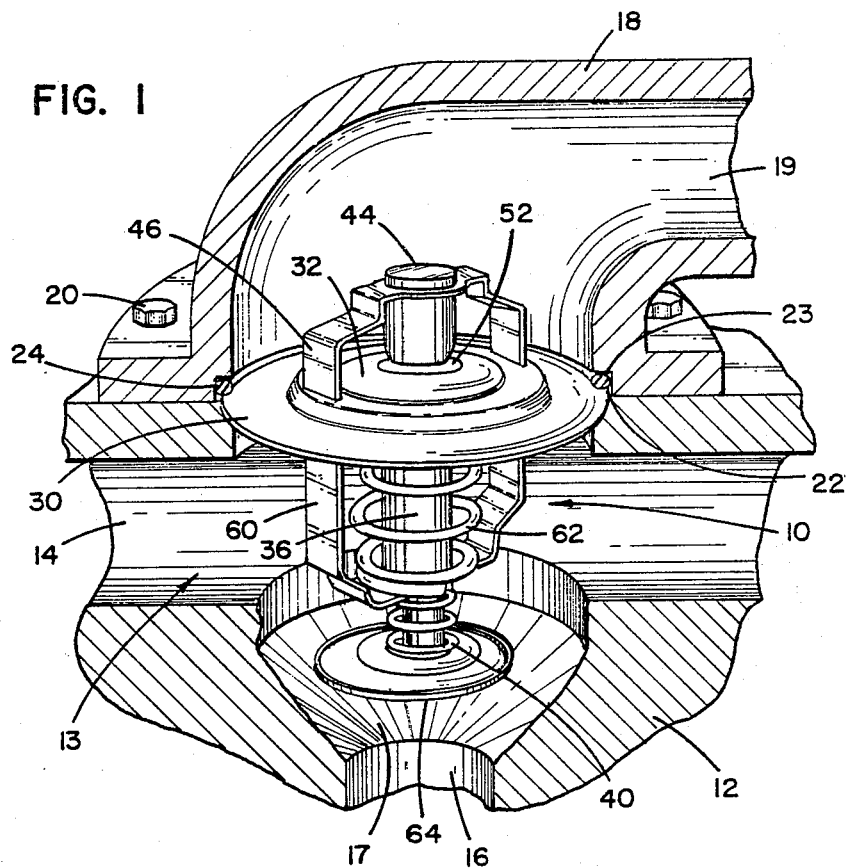
FIG. 1 is a perspective view, partially broken away, of a fail-safe thermostat in accordance with the invention.

Referring now to FIGS. 1-5, a thermostat 10 in accordance with the invention is mounted in an engine block 12 at a flow control junction 13 at which a number of different passageways join. While the passageways may be arranged in different configurations and attitudes, they typically are configured such that an interior coolant passageway is intersected by a conduit from the heat exchanger (radiator) an may also be intersected by a bypass passageway, which when open recirculates coolant within the engine itself. In the present example the coolant passageway 14 extends transversely, as seen in FIG. 1, across the flow control junction 13. The bypass passageway 16, which has a conical inlet wall 17 that converges from its inlet, extends downwardly from the junction 13 into the interior of the engine block 12. Above the flow control junction 13 a thermostat cover 18 provides a passageway 19 leading from the radiator hose (not shown) down into the junction 13, the cover 18 being removably secured by bolts 20 to the engine block 12. The top opening in the engine block 12 in which the thermostat 10 is to be seated and about which the cover 18 is fitted includes a shoulder 22 on which the circular periphery of the thermostat 10 is seated, and above which an edge notch 23 in the cover 18 provides a small gap in which an O-ring 24 is positioned to provide firm sealing of the thermostat 10. A fiber gasket or other sealing means may also be used for this purpose.

Figure 2:
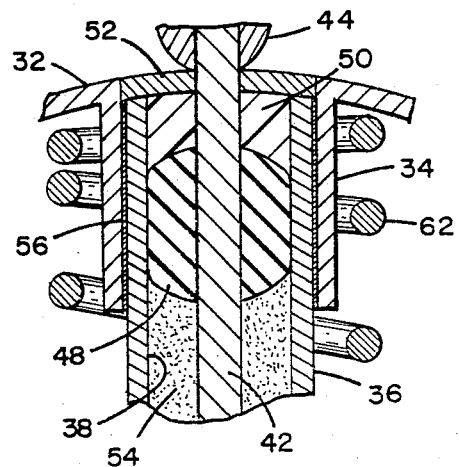
FIG. 2 is an enlarged side sectional view of a portion of the device of FIG. 1 showing further details thereof.
Figure 3:
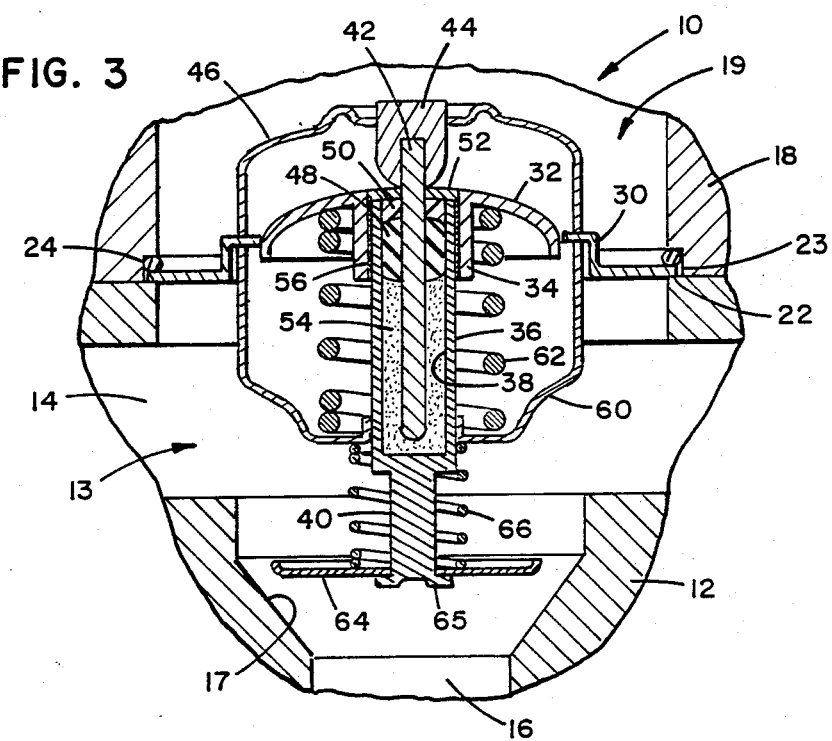
FIG. 3 is a cross-sectional view of a first example of a fail-safe thermostat in accordance with the invention, showing an initial condition of operation.

The thermostat 10 itself comprises an outer main valve ring 30 whose outer periphery is seated on the shoulder 22, and an inner main valve disk 32 of dome shape that is slidably movable along the central axis relative to the ring 30. In the starting condition of operation, as shown in FIGS. 1 and 3, the inner disk 32 provides, with the ring 30, a closed transverse barrier across the radiator passageway 19 at the upper part of the junction 13. As best seen in FIGS. 2 and 3, the inner disk 32 includes an interior depending sleeve 34 adjacent its inner periphery, and encompassing a cylindrical body 36 extending along the central axis. The body 36 has an open interior chamber 38 along most of its length along the central axis, as seen in FIGS. 2-5, and an end extension 40 at the end facing the bypass passageway 16. The valve disk 32 has a central aperture which provides clearance so that the valve disk 32 may pass upwardly about an end structure described below.

A central rod 42 (FIGS. 2-5) extends downwardly into the interior chamber 38 of the cylindrical body 36, being seated in an end fitting 44 which is held in fixed relation by two arms of a rod support strap 46 to the outer valve ring 30. In this example the central rod 42 is immovable with temperature changes in the coolant but the cylindrical body 36 is displaceable. The interior chamber 38 is closed off about the central rod 42 at its upper end by an elastomeric seal 48 about the rod 42. A filler member 50 and an end cap 52 close off the upper end of the interior chamber. The rod support strap 46 forms the upper portion of an open sided housing that permits free access of coolant to the valve segments 30, 32.

The interior chamber 38 is filled, about the central rod 42 and under the elastomeric seal 48, with a thermally responsive wax 54, of known properties for this type of device. That is, the wax 54 has a substantial volumetric change (increase) in response to increased temperatures which thereby, by reaction against the fixed central rod 42, exerts substantial axial forces on the cylindrical body 36. As shown in the Wood and Woods patents mentioned above, the rod may be encapsulated in a flexible but non-compressible manner within the wax 54. The interior of the inner sleeve 34 on the valve disk 32 is closely spaced from the upper exterior of the cylindrical body 36. The cylindrical gap is filled with a fusible alloy 56, here of "Cerro Alloy 5500-1" type, which is selected to become increasingly plastic at temperatures in the range of 242° F. to 248° F. (117° C. to 120° C.). This temperature range is above an acceptable normal operating temperature range for a typical present day pressurized coolant system, and is only reached when some failure exists in the system. Thus this temperature range is that at which the fail-safe operate mode of the thermostat 10 is activated. It is chosen for a modern pressurized system operating at about 14 psi, but different operating pressures require corresponding adjustments of the temperature range for safe operation of the engine. In older engines in which the coolant is kept at about 3–5 psi, for example, the desired temperature at which the alloy is to become plastic is chosen to be correspondingly lower.

Below the main valve ring 30, symmetrically placed arms of a spring coupling strap 60 are joined to the under side of the ring 30 and extend to opposing sides of the cylindrical body 36, without being attached. A large compression spring 62 is positioned between the under side of the valve disk 32 and the upper surface of the spring coupling strap 60.

A bypass disk valve 64 fitting about the end extension 40 is initially seated on a radial lip 65 at the end of the extension 40, and is slidable on the extension against a small compression spring 66. The small compression spring 66 engages the upper side of the disk valve 64 at one end and the under side of the coupling strap 60 at the other to maintain it extended against the closest adjoining surface.

Figure 4:
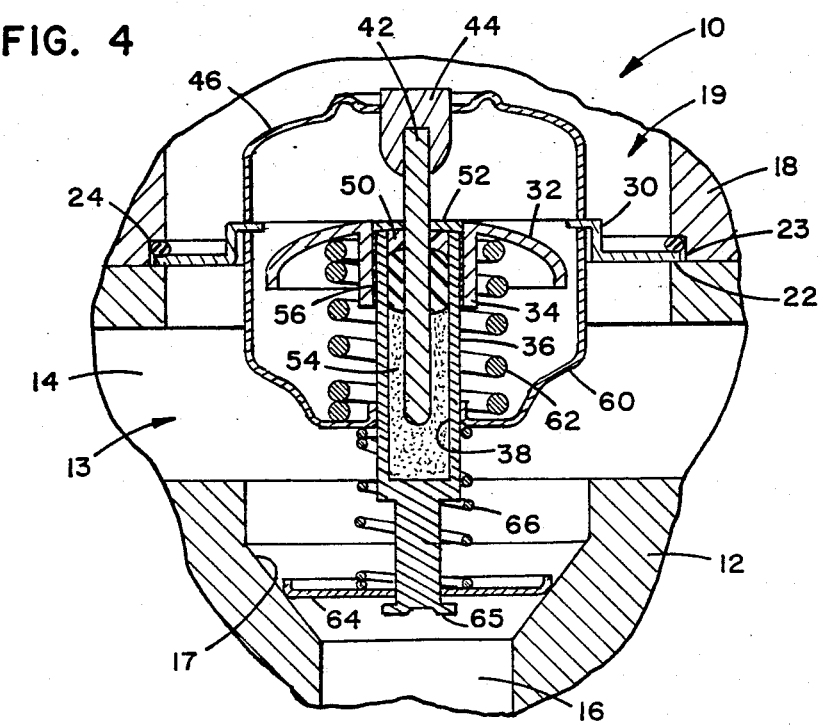
FIG. 4 is a side sectional view of the device of FIG. 2, showing a normal cooling condition of operation.

In initial operation, as seen in FIG. 3, the coolant flow path is entirely interior to the engine block 12, because the valve disk 32 is in alignment with the valve ring 30. The bypass disk valve 64 is spaced apart from the conical wall 17 leading to the bypass passageway 16 because the wax 54 is cold and unexpanded. Thus coolant circulation, with the engine and coolant cold, is retained within the engine block 12. As the coolant starts to heat up, however, the wax 54 expands, and the only direction in which the expansion can be accommodated is by downward movement of the cylindrical body 36. The attached disk valve 32, which is secured to the body 36 by the fusible alloy 56 also valves downwardly. The central rod 42, elastomeric seal 48 and closure members 50, 52, remain in fixed position as the assembly slides downwardly, against the large compression spring 62. As the downward movement takes place, the bypass disk valve 64 closes with the conical wall 17 leading to the bypass passageway 16, reducing the bypass flow as the engine heats. Concurrently, a flow gap appears between the valve disk 32 and the valve ring 30, so that flow to the radiator occurs via the passageway 19. When the normal temperature operating range is reached, the condition is as shown in FIG. 4, with the bypass valve disk 64 closed against the wall 17, and with the main valve open. This opening varies in response to temperature, as determined by the thermal expansion of the wax 54, so as to maintain the coolant temperature in the selected range. The bypass valve disk 64, after sealing on the conical wall 17, is held by the small compression spring 66 even though the physical separate end extension 40 moves further down.

Figures 5, 6:
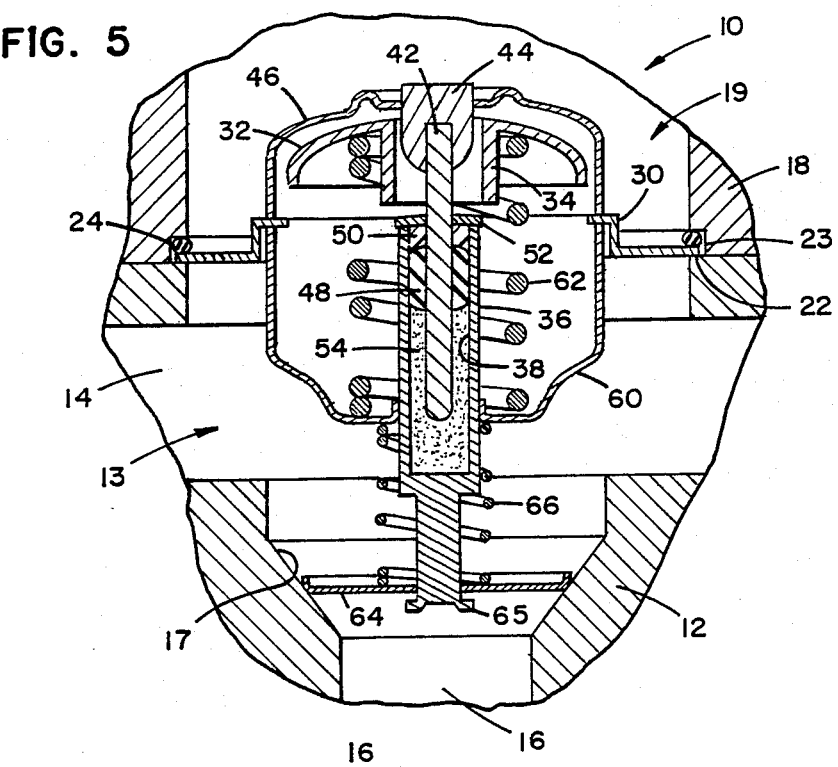
FIG. 5 is a side sectional view of the device of FIG. 2, showing a fail-safe mode of operation.
FIG. 6 is a side sectional view of a second fail-safe thermostat device in accordance with the invention in an initial mode of operation.

When the normal operating temperature range is substantially exceeded, however, the thermostat is typically malfunctioning, which may result from corrosion from impurities, sticking of the valve parts, or other causes. In such event, the fusible alloy 56 melts, releasing the main valve disk 32 from the cylindrical body 36. Thus the large compression spring 62 is the sole force acting against the main valve disk 32, and the disk 32 is forced upwardly, to a limit position, as shown in FIG. 5. In the fail-safe position the main valve disk 32 is well above the ring 30, and there is full coolant flow through the radiator passageway 19. At the same time the bypass path remains closed, because the small compression spring 66 holds the valve disk 64 against the adjacent wall and keeps the now freed cylindrical body 36 in the lowered position, whether or not the wax 54 is present.

With this arrangement, fail-safe operation is achieved in a standard mount and with only one more part than is used in a conventional thermostat. Because the fusible alloy 56 has very high strength in shear, only a relatively thin gap need be used between the cylindrical body 36 and the encompassing sleeve 34, so that upon melting only an insignificant amount of material is released into the system. The operator of the vehicle will know, from relatively long warm-up periods needed on starting the engine and from lower than normal temperature operating conditions, that a thermostat replacement is required. An indicator light (not shown) can be in circuit with the thermostat 10 to signal that the fail-safe mode had been initiated.

The type of fusible alloy used in this example is non-eutectic and has varying degrees of plasticity when its transition temperature range is reached. "Cerro Alloy 5500-1" is composed of 55% bismuth, 44% lead and 1% tin, and changes from a solid through increasingly plastic stages until it becomes fluidic. This type of noneutectic alloy can have a transition range from a few degrees to over two hundred degrees. On reaching the fluid state the material is still of relatively high viscosity. Further, flow will begin at very high pressures, such as 500 psi, even though it may be very slow with time. Thus the strength in shear varies across the range, and the relative displacement of elements joined by the material depends upon the area in shear and the differential force exerted, as well as the temperature. In the present example the typical radial clearance between the cylindrical member 36 and external sleeve 34 is about 0.001", and the shear wall is 0.400" long, so that only 9 milligrams of fusible alloy is used. Consequently, the temperature at which the fail-safe mode is initiated can be varied by changing the spring compliance, or the length of the sleeve, or both.

By this arrangement, the main valve opens in one direction against the large compression spring 62 in normal mode of operation, and in the opposite direction, with the spring 62 in the fail-safe conditon. Corrosion, sticking, and other factors that interfere with normal operation cannot prevent full opening when the emergency condition is reached because the large spring exerts enough force to assure operation.

Figure 7:
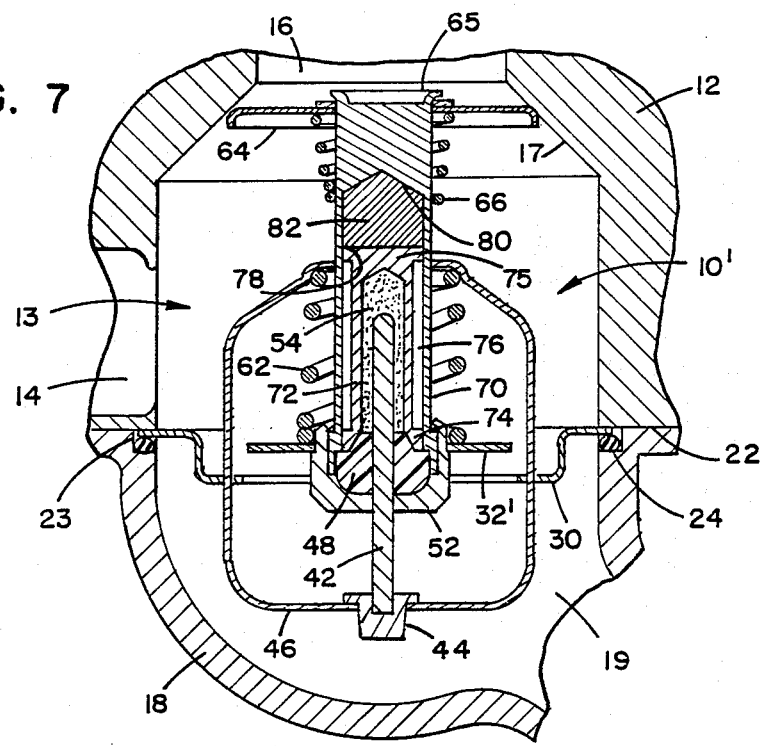
FIG. 7 is a side sectional view of the device of FIG. 6, showing a normal cooling mode of operation.
Figure 8:
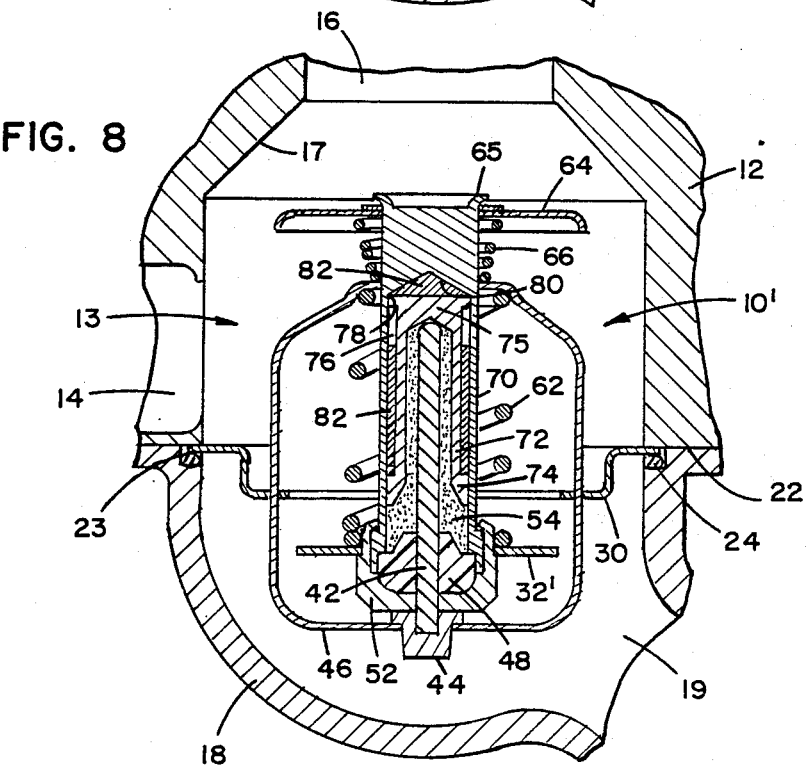
FIG. 8 is a side sectional view of the device of FIG. 6 in accordance with the invention showing a fail-safe mode of operation of the device.

Referring now to FIGS. 6–8, a different example of a fail-safe thermostat in accordance with the invention is provided in which the fusible alloy is retained entirely within the structure. The mounting in this instance is one in which the cover 18 is on the underside and the fail-safe thermostat 10' is inverted relative to the example of FIGS. 1–5. It will be understood that hereafter references to direction or relative position are merely for the sake of convenience and that the device can be used in any orientation. The thermostat 10' has a central rod 42 surrounded by thermally responsive wax 54 as previously described, but these elements are within an inner cylindrical sleeve 72 that is initially immovable within the outer cylindrical body 70. The inner cylindrical sleeve 72 has a first flange end 74 and an opposite closed end 75 between which is contained the thermally responsive wax 54 and central rod 42. The first end (lower end as viewed in FIGS. 6–8) of the cylindrical body 70 engages and is coupled to the inner main valve segment 32'. The inner sleeve 72 is separately closed off by the elastomeric seal 48 at the flange end 74, the seal being seated in the end cap 52. There is a radial space between the principal outer surface of the inner sleeve 72 and the facing inner surface of the cylindrical body 70. This space defines a relief gap volume 76 about the inner sleeve 72, leading upwardly through a concentric aperture or apertures 78 at the upper end of the sleeve 72 to an end volume 80 in the cylindrical body 70, above the inner sleeve 72. This end volume 80 is initially filled with the fusible alloy 82, presenting a normally solid base that forces the cylindrical body 70 up as the inner sleeve 72 moves with wax 54 expansion. Such movement overcomes the axial force exerted by the large compression spring 62.

In the starting condition of operation, as shown in FIG. 6, the bypass path is open, and because of the low initial starting volume of the thermally responsive wax 54 the peripheral edges of the main valve disk 32' are in alignment with the facing edges of the main valve ring 30, so that the main valve is closed, blocking off the radiator passageway 19. As the wax 54 expands, axial force is exerted upwardly on the inside of the inner sleeve 72, against the solid fusible alloy 82 and thus against the upper end surface of the end volume 80 within the cylindrical body 70, moving the assembly of two cylinders 70, 72 up. The coupled bypass valve disk 64 moves upwardly as well until it closes against the conical wall 17. When the normal operating range is reached, as shown in FIG. 7, the bypass valve disk 64 has closed the bypass passageway 16 and is somewhat displaced below the end of the housing extension 40. The main valve disk 32' is raised well above the level of the inner edges of the main valve ring 30, opening the radiator passageway 19 to an extent that is modulated in accordance with temperature of the coolant.

In the event of an excess temperature, causing the fusible alloy 82 to become plastic so that it no longer provides a solid base resisting axial forces exerted by the expanded wax 54, the end portion 75 of the inner cylinder 72 no longer encounters a solid fusible alloy body and is allowed to move axially downwardly. More specifically, the upper surface of the end volume 80 can move downwardly under the axial force exerted on the main valve disk 32' by the large compression spring 62, which forces the melted fusible alloy 82 downwardly through the concentric apertures 78 into the relief gap volume 76, about the inner sleeve 72.

The displacement of fusible alloy 82 occurs over a certain axial length that is not fully adequate for the outer cylindrical body 70 and the coupled main valve disk 32' to move downwardly below the level of the main valve ring 30. The remainder of the downward axial movement results from displacement of the wax 54 into the greater inner volume now available, as seen in FIG. 8, because of displacement of the elastomeric seal 48 from the flange 74 on the inner cylinder 72. The outer cylinder 70 pulls the inner cylinder 72 downwardly to a limit position, allowing full axial displacement of the inner valve disk 32' to well below the outer valve segment 30. Again, therefore, the main valve is opened to the opposite limit in the fail-safe mode. The same results are achieved as in the example of FIGS. 1–5, but the fusible alloy 82 is entirely retained within the structure. In this example, however, the downward movement of the outer cylindrical body 70 draws with it the extension 40 and the bypass disk valve 64, as the end fitting 52 engages the end fitting 44. Thus, although the coolant passageway 19 is permanently opened, the bypass passageway 16 is also opened in this version when the fail-safe mode is activated.

The configuration of FIGS. 6 to 8, as described, achieves full and adequate travel of the inner disk valve 32' by adding the increment of movement due to displacement of the wax 54 to the incremental displacement resulting from flowing of the fusible material 82. There are constraints on the shape and size of the central rod, imposed by the character of the fusible alloy. This material, even as a solid at ambient temperature, can flow, albeit slowly, at sufficient pressure (about 500 psi). Thus as the temperature increases and the wax expands, the base area of the contacting elements should be large enough to keep the pressure below the level at which premature flow occurs. The fusible alloy decreases in viscosity with temperature through its critical range, but even at the upper end of the range is quite viscous and flows slowly. Thus the shift of elements into the fail-safe position occurs over an interval (short but finite) instead of in one abrupt movement. Also, the internal hydraulic pressure must be kept below the range limits, so that the external surface area of the central rod 42 must have adequate area. Both the length and diameter of the rod must be greater than certain minimums in order for these requirements to be met. Given the passageways within which the thermostat must fit, a standardized thermostat which can be used in a number of vehicle models is subject to these design constraints.

In other configurations in which the length of the elements can be increased, the end chamber containing fusible material can alone be long enough to permit shifting to the fail-safe limit position. In the example of FIGS. 6–8 about 4.3 grams of fusible material is used, but if reliance is not to be placed on wax displacement a greater amount of alloy may be employed. However, shapes may also be changed to provide greater surface area, as by using a curved rather than a flat end on the inner cylinder or a square or double cross-section rather than a circular cross-section on the central rod.

It should be noted that leakage of wax in either of the given examples does not prevent reaching the fail-safe position. In the example of FIGS. 1–5, when the fusible alloy 56 melts and the sleeve 34 shears off, the smaller lower spring 66 forces the bypass valve 64 against the radial lip 65 so that the cylinder 36 is also drawn down to the limit position defined by the bypass wall. In the example of FIGS. 6–8, the large spring 62 dominates and forces the inner valve segment 32' to the open, fail-safe position.

It should be appreciated that many vehicles of U.S. manufacture do not employ a bypass passageway, and for this type of system the lower extension of the cylindrical body, with the bypass disk valve, can be omitted. However, if it is desired to provide assurance against improper positioning of the cylinder in the event of loss of wax, an extension sufficient for the lower compression spring to operate may be used.

Although various forms and variations have been suggested, it will be appreciated that the invention is not limited thereto but encompasses all modifications and configurations within the scope of the appended claims.

What is claimed is:

1. A fail-safe thermostat for automotive vehicle cooling systems having a junction joining a coolant passageway for internal coolant circulation, and a radiator passageway, comprising:
   a housing mounted in the junction and including an apertured outer structure;
   an interior valve mounted in the housing in the path of coolant moving between the coolant passageway and the radiator passageway, the interior valve having a fixed outer peripheral segment and an inner segment movable relative thereto;
   thermally responsive actuator means mounted in the housing and including cylinder means slidably mounted relative to the housing and a central rod within the cylinder means and coupled to the housing, the cylinder means being coupled to the inner valve segment and controlling the interior valve segment position by moving in a first direction when coolant temperature increases;
   spring means coupled between the housing and the inner valve segment to oppose movement of the inner valve segment; and
   fusible alloy means disposed to couple the cylinder means temporarily to the inner valve segment and releasing the coupling when melted, to enable the spring means to drive the inner valve segment past the outer segment in a direction opposite the first direction to open a flow path through the housing between the radiator passageway and the coolant passageway.

2. A thermostat as set forth in claim 1 above, wherein the actuator means includes an outer sleeve about the cylinder means coupled to the inner segment and the fusible alloy means is disposed between the cylinder means and the outer sleeve.

3. A thermostat as set forth in claim 2 above, wherein the cooling system includes a bypass passageway and the actuator means includes bypass valve means coupled to the actuator means and movable with the cylinder means.

4. A thermostat as set forth in claim 1 above, wherein the cylinder means includes an interior cylinder about the central rod, the interior cylinder being configured within the cylinder means to provide an end chamber and an interconnected side chamber, and wherein the fusible alloy is disposed in the end chamber to allow shifting of the cylinder means and the inner valve segment relative to the interior cylinder in the event of melting of the alloy.

5. A thermostat as set forth in claim 4 above, wherein the cooling system includes a bypass passageway and the actuator means includes bypass valve means coupled to the cylinder means and moving with the cylinder means.

6. A vehicular thermostat for controlling flow of coolant in a passageway between a coolant pump and a radiator comprising:
   cylindrical means defining a central interior chamber having an open end;
   central rod means extending into the interior chamber through the open end and having a free end adjacent the passageway;
   seal means within the cylindrical means slidably engaged to the central rod means and closing the open end of the interior chamber;
   a temperature responsive medium filling the interior chamber, said medium volumetrically changing with temperature to act against the central rod means and exert force on the cylinder means to displace the same axially in a first direction;
   valve means coupled to the cylindrical means and movable therewith, the coupling including a temperature responsive alloy material;
   thermostat housing means mountable in fixed relation to the passageway and coupled to the free end of the central rod to hold the central rod in fixed relation; and
   means including a spring means disposed between the valve means and the thermostat housing means for (1) opposing movement of the valve means in the first direction and (2) shifting the position of the valve means if the coolant exceeds a predetermined temperature and melts the temperature responsive alloy material.

7. The invention as set forth in claim 6 above, wherein the cylindrical means comprises exterior sleeve means about the cylindrical means and coupled to the valve means, and wherein the alloy is disposed between the sleeve means and the cylindrical means.

8. The invention as set forth in claim 7 above, wherein the sleeve means is disposed about the cylindrical means adjacent the open end thereof and joined to the valve means.

9. The invention as set forth in claim 6 above, wherein the cylindrical means defines a pair of axially separated chambers having interconnecting conduit means, and wherein the alloy is disposed initially in one of the chambers and flows into the other through the interconnecting conduit means upon melting.

10. The invention as set forth in claim 6 above, wherein the system has a bypass passageway disposed apart from the coolant passageway, wherein the thermostat includes a bypass passageway closure member disposed about the end of the cylindrical means adjacent the bypass passageway and the system further includes a separate spring disposed between the bypass passageway closure member and the housing for urging the bypass passageway closure member into sealing position, the bypass passageway closure member being movable relative to the cylindrical means.

11. A fail-safe thermostat for automotive vehicles comprising:
   a cylindrical body having an interior chamber;
   flow valve means coupled to the cylindrical body, the flow valve means including a fixed ring outer portion and a movable disk central portion;
   central rod means coupled to the fixed outer portion and extending into the interior chamber;
   temperature responsive wax means within the interior chamber and expanding under normal temperature conditions to urge the cylindrical body in a first direction by exerting force against the central rod means;
   means including fusible alloy means coupling the movable disk central portion of the flow valve means to the cylindrical body to move the cylindrical body and the movable disk portion in a first direction in response to increasing temperature, the fusible alloy being positioned to release the movable disk from force exerted against the central rod means by the wax means upon melting when a predetermined temperature above the normal operating temperature is reached; and spring means coupled between the fixed outer portion and the movable disk portion to resiliently oppose movement in the first direction and to force the movable disk in a second direction to open the valve when the fusible alloy means melts.

12. The invention as set forth in claim 11 above, wherein the fusible alloy means is disposed between the outer part of the cylindrical body and an inner part of the movable disk portion.

13. The invention as set forth in claim 11 above, wherein the cylindrical body includes an internal cylindrical member defining the interior chamber, a relief chamber about the internal cylindrical member, and an end chamber in communication with the relief chamber, wherein fusible alloy is disposed in the end chamber such that upon melting of the fusible alloy it is displaced into the relief chamber as the spring means forces the movable disk in the second direction, and wherein the interior chamber volume increases to displace the wax means when the fusible alloy is displaced such that the cylindrical body and the internal cylindrical member both move to limit positions defined by the end of the central rod means extending into the interior chamber.

14. A fail-safe thermostat for coolant flow control in the flow control junction of a vehicular cooling system having a radiator passageway leading to at least one engine block coolant passageway transverse thereto and an aligned bypass passageway, comprising:

cylindrical sleeve means defining a central chamber, the cylindrical sleeve means being positioned in the flow control junction and having a first end extending toward the bypass junction;

an outer ring valve member mounted in the flow control junction to partially block flow between the radiator passageway and engine block passageway;

first support means at the bypass side coupling the outer ring valve member to the cylindrical sleeve means at an intermediate region thereon;

an inner disk valve member coupled to the cylindrical sleeve means and positioned within the outer ring valve member to block flow between the radiator passageway and engine block passageway;

a central rod extending into the central chamber of the cylindrical sleeve means from a second end adjacent the radiator passageway;

second support means on the radiator passageway side coupling the central rod to the outer ring valve member;

means slidably sealing the central rod within the cylindrical sleeve means to define a closed central chamber;

thermally responsive means filling the closed central chamber about the central rod to exert axial force thereon in response to coolant temperature such as to slide the cylindrical sleeve means and the inner disk valve member in the direction toward the bypass passageway;

first compression spring means disposed between the inner disk valve member and the first support means to resiliently oppose motion of the inner disk valve member toward the bypass passageway;

thermally responsive fusible alloy means coupled between the inner disk valve member and the cylindrical sleeve means to release the inner disk valve means from the central rod at a predetermined temperature above normal operating temperature such that the inner disk valve means is urged away from the bypass passageway by the first compression spring means, to open the valve;

bypass valve means slidably positioned on the first end of the cylindrical sleeve means for selectively closing the bypass passageway; and second compression spring means coupled between the first support means and the bypass valve means for resiliently urging the bypass valve means toward the bypass passageway.

15. A thermostat as set forth in claim 14 above, wherein the cylindrical sleeve means comprises an inner cylindrical means and sleeve means disposed about the cylindrical means and coupled to the inner disk valve member, and wherein the fusible alloy means is disposed between the sleeve means and the cylindrical means and provided the only coupling therebetween.

16. A thermostat as set forth in claim 14 above, wherein said cylindrical sleeve means further comprises an inner cylinder disposed within the central chamber and spaced apart from the first end to define an end chamber, the inner cylinder being radially separated from the cylindrical means to define a relief gap, the cylindrical means further comprising conduit means interconnecting the end chamber and the relisf gap, the fusible alloy means initially being disposed in the end chamber.

* * * * *

UNITED STATES PATENT AND TRADEMARK OFFICE
CERTIFICATE OF CORRECTION

PATENT NO. : 4,883,225

DATED : November 28, 1989

INVENTOR(S) : James L. Kitchens

It is certified that error appears in the above-identified patent and that said Letters Patent is hereby corrected as shown below:

Column 4, line 11, "an" should read --and--. Column 5, line 52, after "also", "valves" should read --moves--. Column 12, line 49, after "the" (second occurrence), "relisf" should read --relief--.

Signed and Sealed this

Thirteenth Day of August, 1991

Attest:

HARRY F. MANBECK, JR.

Attesting Officer

Commissioner of Patents and Trademarks